United States Patent
Glimcher et al.

(10) Patent No.: US 11,847,316 B2
(45) Date of Patent: Dec. 19, 2023

(54) SYSTEM AND METHOD FOR MANAGING DATA STORAGE IN NETWORK INTERFACE CONTROLLERS

(71) Applicant: Dell Products L.P., Round Rock, TX (US)

(72) Inventors: Boris Glimcher, Tel Aviv-Jaffa (IL); Aric Hadav, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 17/722,977

(22) Filed: Apr. 18, 2022

(65) Prior Publication Data

US 2023/0333735 A1    Oct. 19, 2023

(51) Int. Cl.
*G06F 3/06* (2006.01)

(52) U.S. Cl.
CPC ............ *G06F 3/0604* (2013.01); *G06F 3/067* (2013.01); *G06F 3/0655* (2013.01)

(58) Field of Classification Search
CPC ....... G06F 3/0604; G06F 3/0655; G06F 3/067
See application file for complete search history.

(56) References Cited

U.S. PATENT DOCUMENTS

| | | | |
|---|---|---|---|
| 2005/0188105 A1* | 8/2005 | Reinhard | H04L 12/4633 709/238 |
| 2015/0033220 A1* | 1/2015 | Venkat | G06F 9/45558 718/1 |
| 2015/0154127 A1* | 6/2015 | Squires | G06F 9/455 703/25 |
| 2017/0060483 A1* | 3/2017 | Klee | G06F 3/0659 |
| 2019/0306575 A1* | 10/2019 | Savarkar | H04L 67/1097 |
| 2020/0012440 A1* | 1/2020 | Wang | H04L 67/1097 |
| 2020/0201827 A1* | 6/2020 | Chacko | G06F 9/4451 |
| 2022/0103490 A1* | 3/2022 | Kim | H04L 49/901 |
| 2022/0206964 A1* | 6/2022 | Kim | G06F 13/107 |

* cited by examiner

*Primary Examiner* — Jeong S Park
(74) *Attorney, Agent, or Firm* — Womble Bond Dickinson (US) LLP

(57) ABSTRACT

Methods and systems for managing storage of data in a distributed system are disclosed. To manage storage of data in a distributed system, a data processing system may include a network interface controller (NIC). The NIC may present emulated storages that may be used for data storage. The emulated storage devices may be implemented with a storage pipeline that uses any number of storage devices that may be local or remote to the data processing system. The computing resources of the data processing system may view the emulated storage as a local device. The NIC may use its storage pipeline to service its own storage needs. By doing so, the NIC may improve the likelihood that its hosted applications have sufficient storage service access.

20 Claims, 6 Drawing Sheets

SYSTEM AND METHOD FOR MANAGING DATA STORAGE IN NETWORK INTERFACE CONTROLLERS

FIELD OF THE DISCLOSED EMBODIMENTS

Embodiments disclosed herein relate generally to data storage. More particularly, embodiments disclosed herein relate to systems and methods for management of data storage by network interface controllers.

BACKGROUND

Computing devices may store data and used stored data. For example, computing devices may utilize data when providing computer implemented services. Different computing devices may perform similar and/or different functions. The components of computing devices may generate data that may be relevant to future operations. The data may be used during the future operations.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
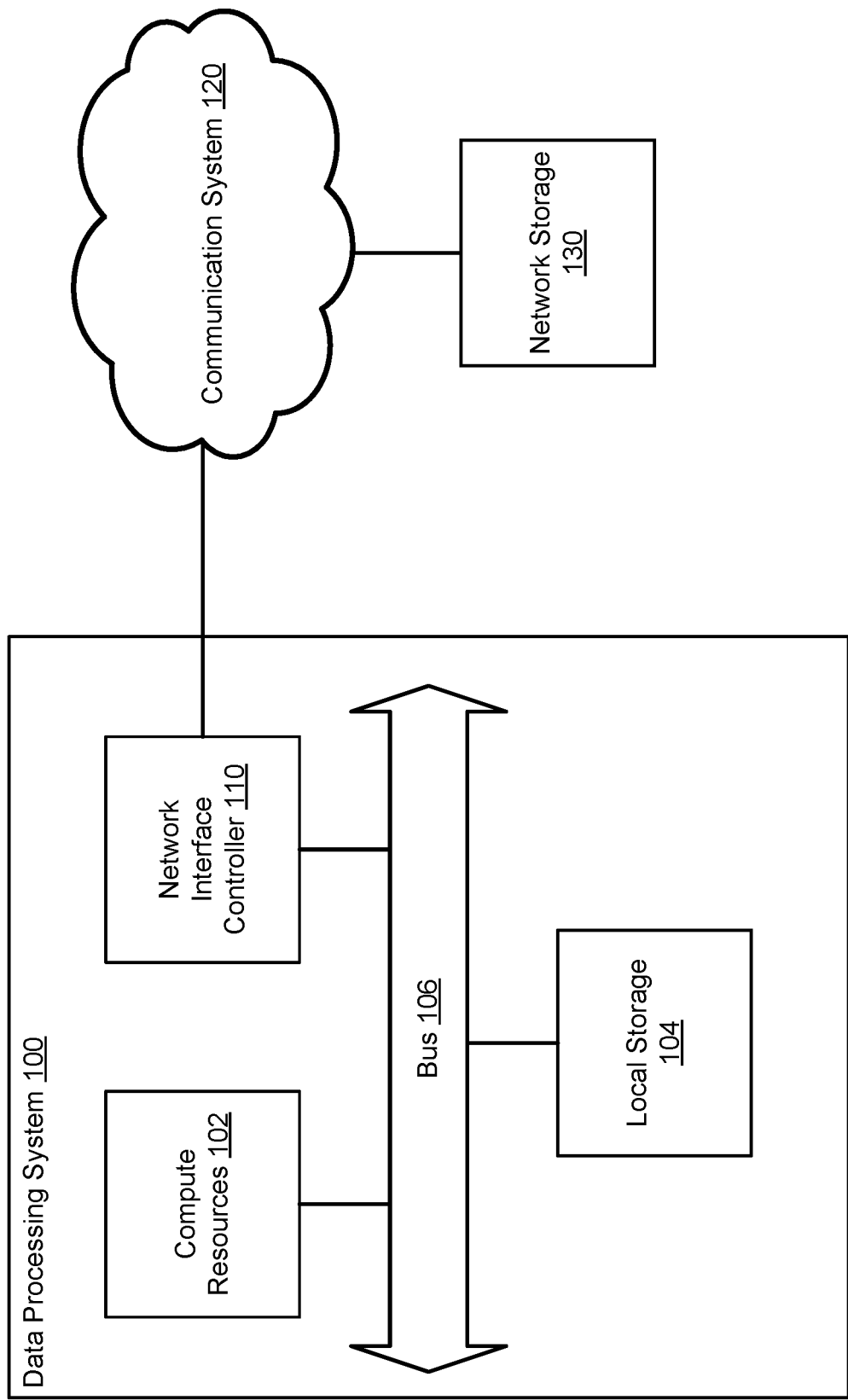
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage of data in a distributed system. To manage storage of data in a distributed system, a data processing system may include a network interface controller (NIC). The network interface controller may present emulated storages that may be used for data storage. The emulated storage devices may be implemented with a storage pipeline that uses any number of storage devices that may be local or remote to the data processing system. The computing resources of the data processing system may view the emulated storage as a local device.

The NIC may host applications that may use storage. The NIC may not include storage sufficient to meet the needs of the applications. To meets the storage needs of the applications, the NIC may use its storage pipeline to store data from the hosted applications using other storage devices. To do so, the NIC may instantiate another emulated storage device, and direct access requests to the other emulated storage device.

By doing so, the NIC may ensure that its applications have sufficient storage services, and may also receive the benefits of the storage pipeline that it uses to service access requests from other devices (e.g., compute resources of a host data processing system). By doing so, an improved data processing system may be provided that includes a NIC that is not limited in its operation by the quantity of onboard storage it is allocated. Accordingly, the functions performed by the applications hosted by the NIC may not be restricted due to storage limitations.

In an embodiment, a computer-implemented method for managing data storage in a Network Interface Controller (NIC) of a data processing system is provided. The method may include obtaining, from an application hosted by the NIC, an access request, the access request being for a storage device emulated by the NIC; routing the access request to an emulated storage device endpoint for the emulated storage device, the emulated storage device endpoint being presented externally by the NIC; after being received by the emulated storage device endpoint, performing processing services for the access request to obtain a processed access request, the processing services being unsolicited by the application; identifying a target storage device for the access request, the target storage device being different from the emulated storage device endpoint; and servicing the access request using the identified target storage device and the processed access request.

The processing services may include one selected from a group consisting of deduplication, encryption, compression, and integrity verification.

Routing the access request may include transmitting the access request onto a bus operably connected to the NIC; and receiving the access request via the bus, the transmitting and receiving being performed using two endpoints presented by the NIC, and one of the two endpoints being the emulated storage device endpoint.

Performing the processing services may include identifying that the access request was received via the emulated storage device endpoint; matching the emulated storage device endpoint to a portion of processing services provided by the NIC; and selecting the processing services based on the portion of the processing services provided by the NIC.

The bus may be a virtual bus between the emulated storage device endpoint and a connection endpoint (e.g., a connection manager) of the NIC that is available to the application.

The computer-implemented method may also include making a determination that the access request requires more storage space than is available to the NIC locally; and selecting the emulated storage device to service the access request.

The storage device may be remote to the data processing system. The storage device may be operably connected to the data processing system via a network.

Servicing the access request using the identified target storage device and the processed access request may include packetizing the processed access request to obtain packets; and transmitting the packets to the storage device via the network.

The NIC may present the emulated storage device as a local device (e.g., local to the data processing system).

A non-transitory media may include instructions that when executed by a processor cause the computer-implemented method to be performed.

A data processing system may include the non-transitory media and a processor (e.g., of a NIC), and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different systems may provide similar and/or different computer implemented services.

To provide the computer implemented services, data processing system 100 may include various hardware resources such as compute resources 102, local storage 104, network interface controller (NIC) 110, and bus 106. Compute resources 102 may include hardware devices such as processors, memory modules, etc. Local storage 104 may include storage devices such as hard disk drives, solid state drives, storage controller, etc. NIC 110 may facilitate communication with other remote devices. For example, NIC 110 may facilitate communication with network storage 130. Any of these components may be operably connected to one another and/or other components (not shown) via bus 106.

When providing the computer implemented services, data may be stored for future use in local storage 104 and/or remote storage devices such as network storage 130 (and/or other remote storages). To facilitate use of network storage 130 (and/or other remote or local storages), MC 110 may present an emulated storage (e.g., by presenting an emulated storage endpoint) to compute resources 102 via bus 106. Consequently, compute resources 102 may direct access requests (e.g., storage, read, delete) for the emulated storage to NIC 110.

To implement the emulated storage, NIC 110 may use the storage resources of network storage 130 (and/or other remote or local storage devices operably connected to it).

For example, network storage 130 may also include a NIC (not shown) that may include functionality to secure, format, and use storage resources local to network storage 130. When an access request for the emulated storage is received by NIC 110, NIC 110 may use translation tables, lookup tables, and/or implement various procedures for servicing the access request via network storage 130. However, from the perspective of compute resources 102, the emulated storage may appear to be a bare metal device operably connected to it via bus 106.

As part of the processes performed to service access requests, NIC 110 may support various types of processing such as, for example, deduplication, integrity verification (e.g., parity checking), compression, redundant storage (e.g., striping, mirroring, etc.), etc. NIC 110 may automatically perform such processing without compute resources 102 being aware of the processing. By doing so, the quality of storage services provided by NIC 110 may be improved while being transparent to compute resources 102. For example, any of these services may improve, for example, the quantity of data that may be stored in a fixed quantity of storage, correct data corruption, provide for data redundancy, etc.

To facilitate processing of access requests, NIC 110 may host a software stack. The software stack may be adapted to process access requests directed to emulated storage devices presented by NIC 110.

NIC 110 may also host applications that may also provide various computer implemented services. Like the computer implemented services provided by the applications hosted by compute resources 102, the computer implemented services provided by NIC 110 may result in data that may need to be used in the future. The computer implemented services provided by NIC 110 may be similar and/or different from the computer implemented services provided by the application hosted by compute resources 102.

NIC 110 may include a limited quantity of onboard storage. For example, in contrast to local storage 104 and network storage 130, NIC 110 may not include native functionality to store large quantities of data onboard due to lack of storage space.

In general, embodiments disclosed herein relate to systems, methods, and devices for managing data storage in a data processing system. To manage data storage in a data processing system, NIC 110 may utilize the emulated storage device to ingest data from itself, and store the ingested data in other locations (e.g., network storage 130, other storage devices local to data processing system 100 but not shown in FIG. 1). NIC 110 may use this approach to managing data when it has insufficient onboard storage to handle access requests itself.

For example, applications hosted by NIC 110 may need to store quantities of data that exceed the local storage capacity of NIC 110. To store the data, NIC 110 may direct access requests for the data to an endpoint associated with the emulated storage device. The data may be subjected to processing by the software stack implemented by NIC 110 and/or stored in storages remote to NIC 110.

By doing so, embodiments disclosed herein may facilitate storage of data by NICs in scenarios in which the NICs lack sufficient onboard storage to store the data. Further, by ingesting the access requests for the data through the emulated storage device endpoint, the advantages conferred through automated processing of data from compute resources 102 may also be conferred to the data from NIC 110.

NIC 110 may be implemented with a hardware devices and/or software components hosted by the hardware devices. In an embodiment, NIC 110 is implemented using a hardware device including circuitry. The hardware device may be, for example, a digital signal processor, a field programmable gate array, system on a chip, or an application specific integrated circuit. The circuitry may be adapted to cause the hardware device to perform the functionality of NIC 110. NIC 110 may be implemented using other types of hardware devices without departing embodiment disclosed herein.

In one embodiment, NIC 110 is implemented using a processor adapted to execute computing code stored on a persistent storage that when executed by the processor performs the functionality of NIC 110 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiment disclosed herein.

Generally, NIC 110 may include functionality to process network data units such as packets. Packets may be exchanged with communication system 120, and device operably connected to communication system 120 such as network storage 130. In the context of storage, when NIC 110 obtains access requests that will result in access requests being directed to network storage 130, NIC 110 may process the access requests, encapsulate them to obtain packets, and direct the packets to network storage 130 via communication system 120. Network storage 130 may include similar functionality to provide for bidirectional transmission of access requests and responses to access requests between NIC 110 and network storage 130.

Bus 106 may be implemented with one or more communication buses. The communications buses may support various communications standards. In an embodiment, bus 106 comprises a Peripheral Component Interconnect Express (PCIE) bus which connects compute resources 102 to NIC 110. NIC 110 may comply with the Non-Volatile Memory Express (NVMe) specification and support NVME communications.

NIC 110 may also support, NVME over fabric (NVMe-oF) communications (or other communication standards) and may communicate with network storage 130 and/or other local storage devices using NVMe-oF communications.

To support NVMe communications, NIC 110 may include functionality to present endpoints (e.g., to other devices), establish initiators to facilitate communications between endpoints and the initiators, and/or implement other methods for communicating via bus 106, communication system 120, and/or other communications facilitates not illustrated in FIG. 1.

Figure 2:
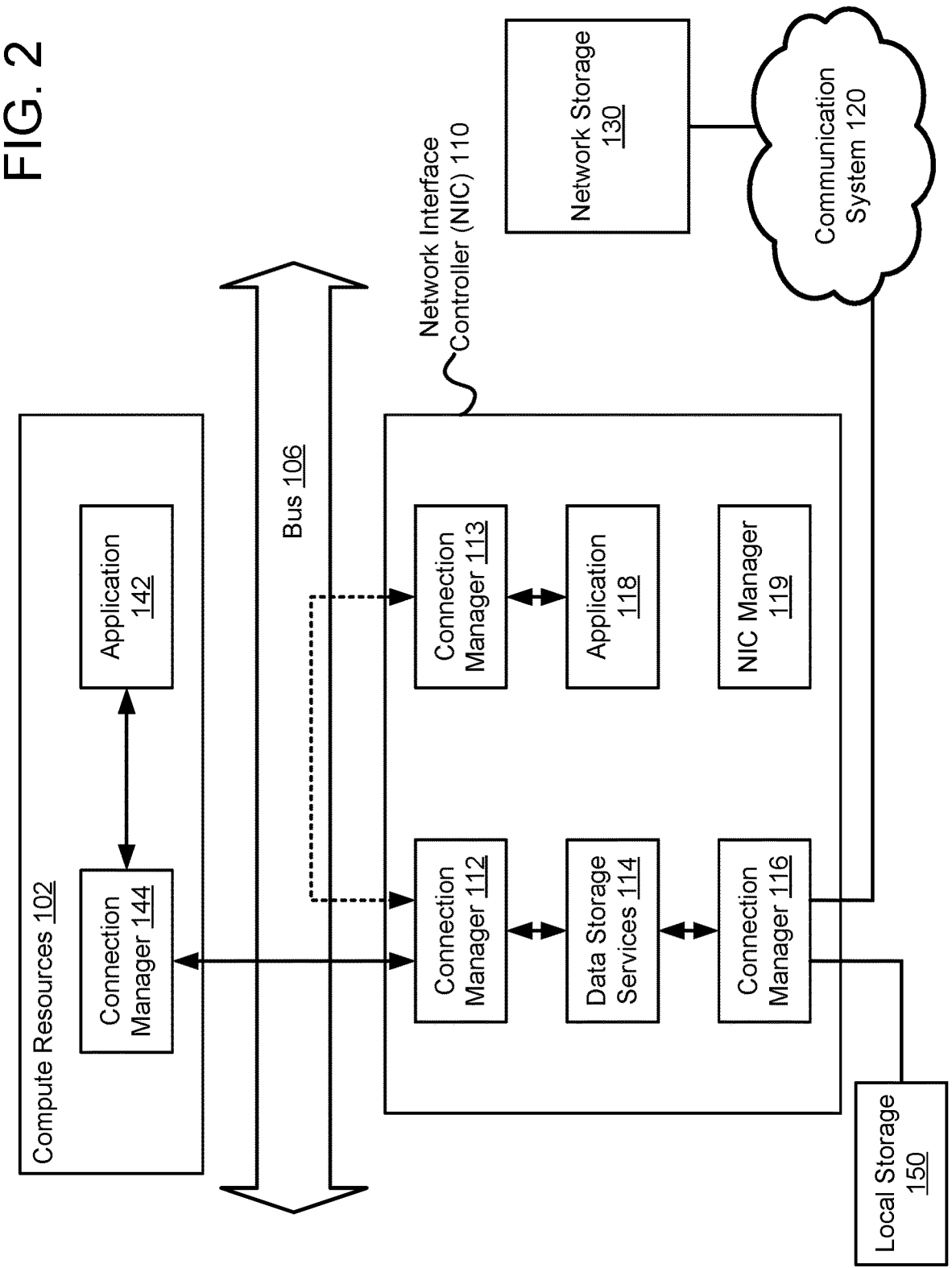
FIG. 2 shows a block diagram illustrating a network interface controller in accordance with an embodiment.

Refer to FIG. 2 for additional details regarding NIC 110.

Network storage 130 may include functionality to service access requests and communicate with NIC 110 over communication system 120. Network storage 130 may be implemented using, for example, a network attached storage system.

In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 120 may include packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of data processing system 100, NIC 110, and network storage 130 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as included a limited number of specific components, a system in accordance with an embodiment may include fewer, additional, and/or different components than those illustrated therein.

As discussed above, NIC 110 may store data locally (e.g., onboard) and remotely using emulated storage devices presented to other devices. Turning to FIG. 2, a diagram of NIC 110 in accordance with an embodiment is shown. As discussed above, data processing system 100 may utilize NIC 110 for storage purposes. To do so, NIC 110 may present an emulated storage device to data processing system. Data processing system 100 may send communications, compliant with the emulated data processing system, to NIC 110 over bus 106 to have access requests for the emulated storage device be serviced.

To communicate with NIC, data processing system 100 may host connection manager 144. Connection manager 144 may generate access requests based on requests from applications 142 (and/or other entities hosted by data processing system 100), encapsulate them as necessary to comply with the communication scheme supported by bus 106, and transmit the encapsulated access request to an emulated storage device endpoint presented by NIC 110.

Connection manager 144 may, in the context of NVMe communications, be implemented with an NVMe initiator. The NVMe may be implemented with a driver or other piece of software for sending communications via bus 106. Applications 142 and connection manager 144 may execute via compute resources 102. While not shown in FIG. 100, data processing system 100 may host an operating system (e.g., which may include connection manager 144) that mediates presentation of storage to applications 142.

To present the emulated storage device endpoint, NIC 110 may host connection manager 112. Connection manager 112 may present emulated storage device endpoints to other devices, such as data processing system 100. Connection manager 112 may present any number of such emulated endpoints. By doing so, NIC 110 may present any number of emulated storage devices to the compute resources of data processing system 100.

When communications are received by connection manager 112, the connection manager may identify a target emulated storage device and initiate processing of the access requests based on the target. For example, connection manager 112 may pass the access requests to data storage services 114 which may perform any number of processing services (e.g., deduplication, compression, etc., as discussed above) on the access requests to obtain processed requests.

The processed access requests may be provided to connection manager 116 which may encapsulate and send the encapsulated processed requests to storage devices, such as network storage 130, local storage 150, or other storage devices not illustrated herein. The manner of encapsulation of the processed access requests may correspond to the communication medium over which they are transmitted. For example, if local storage 150 is operably connected via a PCIe link, then connection manager 116 may encapsulate according to the PCIe standard. Likewise, access requests directed to network storage 130 may be encapsulated for internet protocol based communications.

Connection manager 116 may be implemented with, for example, a PCIe initiator, NVMe-oF initiator, and/or other communication protocol compliant initiators to facilitate communications between NIC 110 and storage devices. Any of connection manager 112 and connection manager 116 may be implemented with, for example, a driver or other type of application.

When deciding where to direct access requests and how to process them, connection manager 116 may utilize lookup tables or other types of data structures that may relate to which emulated storage device an access request is directed to how the access requests are to be processed and where the access requests are to be sent. The data included in the lookup tables may be set by an administrator, may be set by a control plane that may manage NIC 110, and may be dynamically updated over time to provide different qualities of storage service.

In addition to facilitating storage of data from data processing system 100, NIC 110 may host one or more of application 118. Application 118 may provide any type and quantity of computer implemented services. As part of the computer implemented services, application 118 may need to store quantities of data that exceed the quantity of onboard storage of NIC 110.

To manage storage of data by application 118, NIC manager 119 may facilitate use of the storage pipeline (e.g., 112, 114, 116, 130, 150) implemented by NIC 110. To do so, NIC manager 119 may deploy connection manager 113. Like connection manager 144, connection manager 113 may facilitate bidirectional transmission of access requests and response with connection manager 112 so that application 118 may store data in other devices while also obtaining the benefit of the processing performed by data storage services 114.

To facilitate such communications, connection manager 112 may present an emulated storage device endpoint to which connection manager 113 may direct communications via bus 106. Consequently, access requests from applications 118 may flow through connection manager 113 to reach connection manager 112.

In an embodiment, NIC 110 implements a virtual bus that connects connection manager 113 and connection manager 112. By doing so, communications may be transmitted between these components without requiring traversal of bus 106.

While not illustrated in FIG. 2, access requests from application 118 may be serviced by the storage pipeline (e.g., 112, 114, 116, 130, 150) by (i) ingesting them directly into data storage services 114 (e.g., via an application programming interface which may present them to data storage services 114 in a similar manner to that of connection manager 112) or (ii) ingesting them directly into connection manager 116 which may facilitate use of other storage devices without receiving the benefit of the processing performed by data storage services 114.

NIC manager 119 may manage the operation of NIC 110. NIC manager 119 may be implemented using, for example, an operating system. Any of connection manager 112, connection manager 113, and connection manager 116 may be implemented using drivers or other applications of the operating system.

In an embodiment, bus 106 is implemented as a PCIe bus. In such a scenario, the functionality of connection manager 112, connection manager 113, and connection manager 116 may be implemented using a PCIe chipset hosted by NIC 110. The chipset may support both physical and virtual functions. The virtual functions may be used to manage presentation of any number of emulated storage devices. The physical and virtual functions may handle protocol specific requirements such as error handling, doorbells, interrupts, and/or other aspects of sending and receiving information via a physical bus.

In an embodiment, any of connection manager 112, connection manager 113, data storage services 114, application 118, connection manager 116, and NIC manager 119 is implemented using a hardware device including circuitry. The hardware device may be, for example, a digital signal processor, a field programmable gate array, system on a chip, or an application specific integrated circuit. The circuitry may be adapted to cause the hardware device to perform the functionality of connection manager 112, connection manager 113, data storage services 114, application 118, connection manager 116, and/or NIC manager 119. Connection manager 112, connection manager 113, data storage services 114, application 118, connection manager 116, and/or NIC manager 119 may be implemented using other types of hardware devices without departing embodiment disclosed herein.

In one embodiment, any of connection manager 112, connection manager 113, data storage services 114, application 118, connection manager 116, and NIC manager 119 is implemented using a processor adapted to execute computing code stored on a persistent storage that when executed by the processor performs the functionality of connection manager 112, connection manager 113, data storage services 114, application 118, connection manager 116, and/or NIC manager 119 discussed throughout this application. The processor may be a hardware processor including circuitry such as, for example, a central processing unit, a processing core, or a microcontroller. The processor may be other types of hardware devices for processing information without departing embodiment disclosed herein.

Figure 3A:
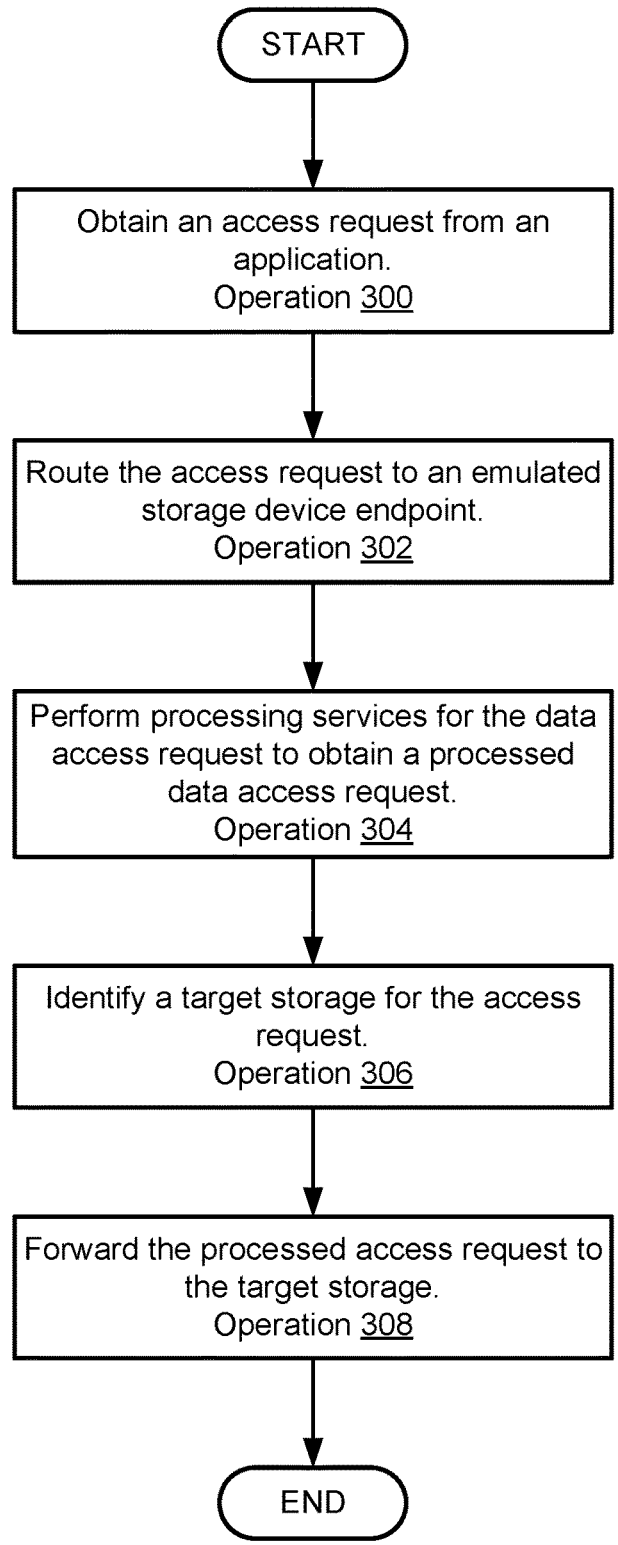
FIG. 3A shows a flow diagram illustrating a method of servicing an access request in accordance with an embodiment.
Figure 3B:
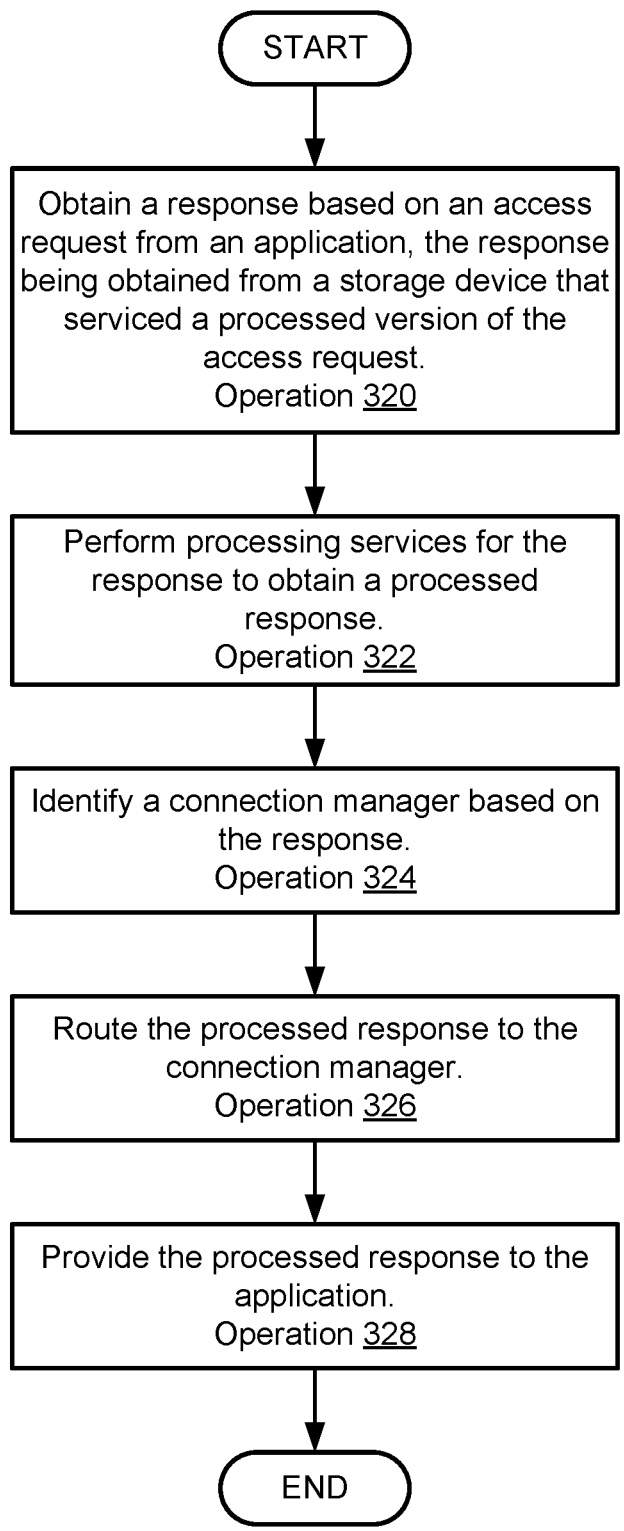
FIG. 3B shows a flow diagram illustrating a method of servicing a response to an access request in accordance with an embodiment.
Figure 3C:
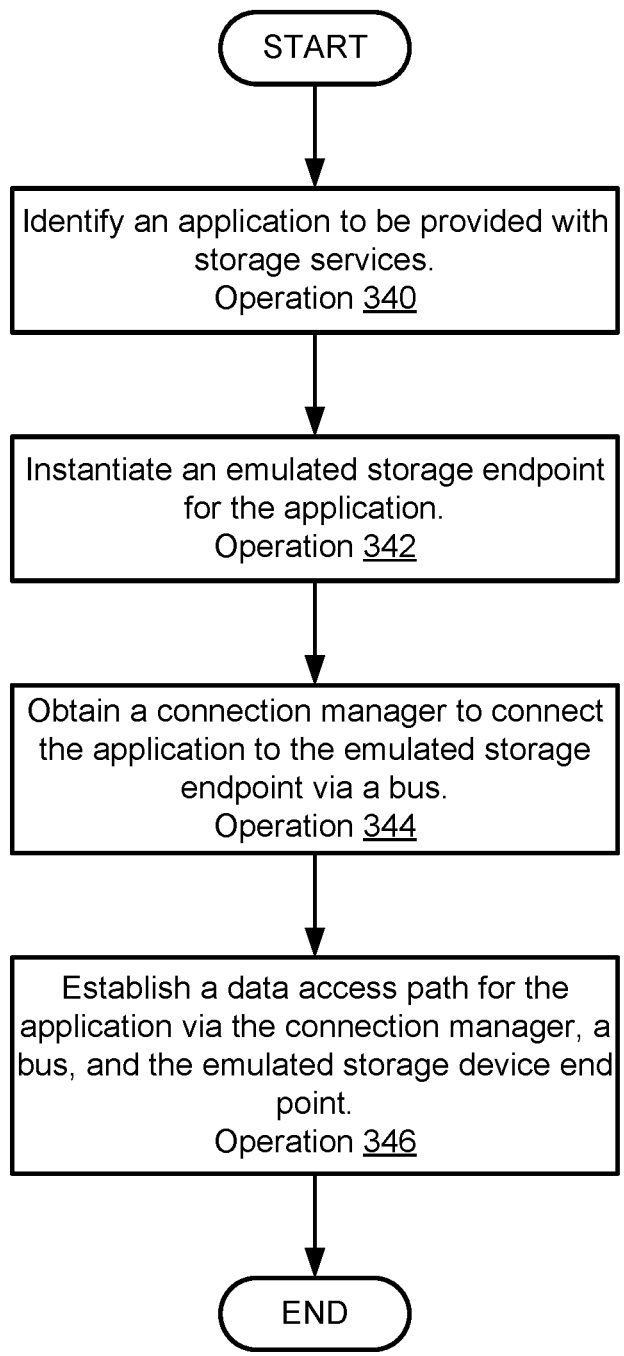
FIG. 3C shows a flow diagram illustrating a method of preparing for servicing access requests in accordance with an embodiment.

Connection manager 112, connection manager 113, data storage services 114, application 118, connection manager 116, and/or NIC manager 119 may perform all, or a portion, of the methods illustrated in FIGS. 3A-3C.

While illustrated in FIG. 2 with a limited number of specific components, a NIC may include additional, fewer, and/or different components without departing from embodiments disclosed herein.

As discussed above, the components of FIG. 1 may perform various methods to store data. FIGS. 3A-3C illustrates examples of methods that may be performed by the components of FIG. 1 when providing their functionalities. In the diagrams discussed below and shown in FIGS. 3A-3C, any of the operations may be repeated, performed in different orders, and/or performed in a parallel with other operations and/or a partially overlapping in time manner with other operations.

Turning to FIG. 3A, a flow diagram illustrating a method of storing data in accordance with an embodiment is shown.

The method may be performed by a NIC, a data processing system, and/or other components.

At operation 300, an access request is obtained. The access request may be from an application hosted by a NIC. The access request may be for data stored in a storage. The storage may be an emulated storage presented by the NIC.

At operation 302, the access request is routed to an emulated storage device endpoint. The access request may be routed by encapsulating it, transmitting it on a bus, and receiving it. The bus may be physical or virtual. The access request may be received by a storage stack hosted by the NIC, and at an emulated storage device endpoint (to which the encapsulated access request may be directed).

At operation 304, processing services for the access request are performed to obtain a processed access request. The processing services may include any of the services, discussed above, including, for example, deduplication, compression, integrity verification, etc.

At operation 306, a target storage for the access request is identified. The target storage may be identified by performing a lookup using an identity of the emulated storage device to which the access request is directed. The target storage device may be identified via the lookup.

At operation 308, the access request is forwarded to the target storage. The access request may be forwarded by packetizing (e.g., in a format compatible with a communication medium) the access request and transmitting it to the storage device (e.g., to an endpoint associated with the storage device).

The method may end following operation 308.

Using the method illustrated in FIG. 3A, embodiments disclosed herein may facilitate storage of data by NICs beyond the onboard capacity of the NICs, and may receive the benefit of processing performed by the NICs.

In an embodiment, operation 302 is not performed. Rather, an application programming interface may be used to inject the access request into the storage pipeline at the processing stage (e.g., operation 304.

In an embodiment, operations 302-304 are not performed. Rather, the access request may be directly stored via a storage device connected to the NIC, without receiving the benefit of processing (e.g., operation 304) and/or abstraction provided by the NIC. For example, a portion of a remote storage may be directly mounted by the MC and used for direct storage of data rather than through an emulated storage.

When the method of FIG. 3A is performed a response may be generated by the storage device that served the processed access request.

Turning to FIG. 3B, a flow diagram illustrating a method of storing data in accordance with an embodiment is shown. The method may be performed by a NIC, a data processing system, and/or other components.

At operation 320, a response (based on an access request from an application) is obtained. The response may be obtained from a storage device that serviced a processed version of the access request. The response may be obtained by receiving it (e.g., by connection manager 116) from the storage device.

At operation 322, processing services for the response are performed to obtain a processed response. The processing services may include any type of services offered by data storage services 114.

At operation 324, a connection manager is identified based on the response. The connection manager may be the connection manager that provided the access request that lead to the response. The response may include information usable to identify.

At operation 326, the processed response is routed to the connection manager. The processed response may be routed, for example, via a physical or virtual bus, as discussed with respect to operation 302.

At operation 328, the processed response is provided to the application. For example, the connection manager may remove encapsulation from the processed response and provide it to the application. The processed response may indicate an outcome of the access request and/or include information (e.g., data from the storage that serviced the access request) provided based on the access request.

The method may end following operation 328.

Using the method illustrated in FIG. 3B, embodiments disclosed may facilitate full bidirectional processing of access requests and responses.

Prior to performance of the methods shown in FIGS. 3A-3B, it may be necessary to put in place connection managers, establish certain configurations, advertise emulated device endpoints, etc. Turning to FIG. 3C, a flow diagram illustrating a method of storing data in accordance with an embodiment is shown. The method may be performed by a NIC, a data processing system, and/or other components.

At operation 340, an application to be provided with storage services is identified. The application may be hosted by a NIC and may need to store data beyond that which the NIC is able to accommodate. The determination may be made, for example, based on a storage request by the application.

At operation 342, an emulated device endpoint is instantiated for the application. The emulated storage endpoint may be instantiated by (i) setting up an emulated storage and (ii) advertising the emulated storage endpoint. The emulated storage may be instantiated by, for example, (i) allocation resources of a storage device external to the NIC and operably connected to the NIC, and (ii) establishing lookup tables or other data structures that device how access requests for the emulated storage are to be handled (e.g., what types of processing are to be performed, where the access requests will be routed, etc.).

At operation 344, a connection manager to connect the application to the emulated storage endpoint via a bus is obtained. The connection manager may be obtained by instantiating it or configuring an existing connection manager to direct access requests to the emulated storage endpoint.

At operation 346, a data access path for the application, via the connection manager, the bus, and the emulated storage device endpoint is established. With reference to FIG. 2, the data access path may follow the path highlighted by the dashed line terminating in arrows. The data access path may allow the application, hosted by the NIC, to utilize the storage services that the NIC provides to the compute resources of the host data processing system.

The method may end following operation 346.

Figure 4:
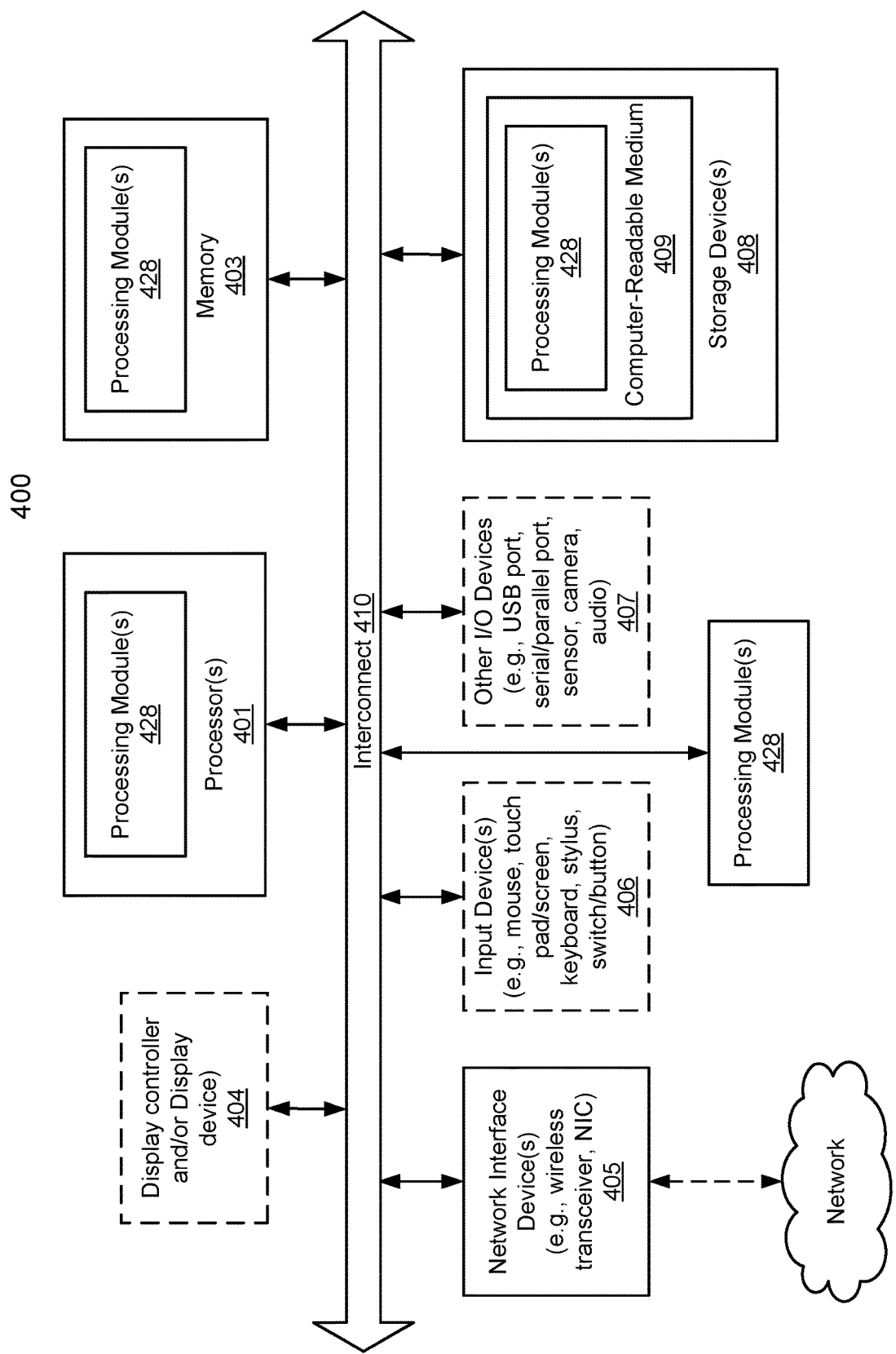
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data storage in a Network Interface Controller (NIC) of a data processing system, the method comprising:
   obtaining, from an application hosted by the NIC, an access request, the access request being for one or more storage devices emulated by the NIC;
   routing, by the NIC, the access request to an emulated storage device endpoint for the one or more storage devices emulated by the NIC, the emulated storage device endpoint being presented externally by the NIC;
   after being received by the emulated storage device endpoint, performing processing services, by the NIC, on the access request to obtain a processed access request, the processing services being unsolicited by the application and the processing services comprising:
      identifying that the access request was received via the emulated storage device endpoint;
      matching the emulated storage device endpoint to a portion of processing services provided by the NIC; and
      selecting the processing services based on the portion of the processing services provided by the NIC;
   identifying, by the NIC, a target storage device for the access request, the target storage device being a first emulated storage device among the one or more storage devices emulated by the NIC and is different from the emulated storage device endpoint; and servicing, by the NIC, the access request using the identified target storage device and the processed access request.

2. The computer-implemented method of claim 1, wherein the processing services comprise one selected from a group consisting of deduplication, encryption, compression, and integrity verification.

3. The computer-implemented method of claim 1, wherein routing the access request comprises:

transmitting the access request onto a bus operably connected to the NIC; and receiving the access request via the bus, the transmitting and receiving being performed using two endpoints presented by the NIC, and one of the two endpoints being the emulated storage device endpoint.

4. The computer-implemented method of claim 3, wherein the bus is a virtual bus between the emulated storage device endpoint and a connection endpoint of the NIC that is available to the application.

5. The computer-implemented method of claim 1, performing the processing services by the NIC further comprises:

making a determination, by the NIC, that the NIC does not have sufficient storage space available locally within the NIC to service the access request; and based on the determination, identifying the target storage device to service the access request.

6. The computer-implemented method of claim 1, wherein the target storage device is remote to the data processing system.

7. The computer-implemented method of claim 6, wherein the target storage device is operably connected to the data processing system via a network.

8. The computer-implemented method of claim 7, wherein servicing the access request using the identified target storage device and the processed access request comprises:

packetizing the processed access request to obtain packets; and transmitting the packets to the target storage device via the network.

9. The computer-implemented method of claim 8, wherein the NIC presents the emulated storage device as a local device.

10. A non-transitory machine-readable medium having instructions stored therein, which when executed by a processor, cause the processor to perform operations for managing data storage in a Network Interface Controller (NIC) of a data processing system, the operations comprising:

obtaining, from an application hosted by the NIC, an access request, the access request being for one or more storage devices emulated by the NIC;

routing, by the NIC, the access request to an emulated storage device endpoint for the one or more storage devices emulated by the NIC, the emulated storage device endpoint being presented externally by the NIC;

after being received by the emulated storage device endpoint, performing processing services, by the NIC, on the access request to obtain a processed access request, the processing services being unsolicited by the application and the processing services comprising:

identifying that the access request was received via the emulated storage device endpoint;

matching the emulated storage device endpoint to a portion of processing services provided by the NIC; and selecting the processing services based on the portion of the processing services provided by the NIC;

identifying, by the NIC, a target storage device for the access request, the target storage device being a first emulated storage device among the one or more storage devices emulated by the NIC and is different from the emulated storage device endpoint; and servicing, by the NIC, the access request using the identified target storage device and the processed access request.

11. The non-transitory machine-readable medium of claim 10, wherein the processing services comprise one selected from a group consisting of deduplication, encryption, compression, and integrity verification.

12. The non-transitory machine-readable medium of claim 10, wherein routing the access request comprises:

transmitting the access request onto a bus operably connected to the NIC; and receiving the access request via the bus, the transmitting and receiving being performed using two endpoints presented by the NIC, and one of the two endpoints being the emulated storage device endpoint.

13. The non-transitory machine-readable medium of claim 12, wherein the bus is a virtual bus between the emulated storage device endpoint and a connection endpoint of the NIC that is available to the application.

14. The non-transitory machine-readable medium of claim 10, wherein the target storage device is remote to the data processing system.

15. The non-transitory machine-readable medium of claim 14, wherein the target storage device is operably connected to the data processing system via a network.

16. A data processing system, comprising:

a processor; and a Network Interface controller (NIC), comprising:

a second processor, and a memory coupled to the processor to store instructions, which when executed by the processor, cause the second processor to perform operations for managing data storage in the NIC, the operations comprising:

obtaining, from an application hosted by the NIC, an access request, the access request being for one or more storage devices emulated by the NIC;

routing the access request to an emulated storage device endpoint for the one or more storage devices emulated by the NIC, the emulated storage device endpoint being presented externally by the NIC;

after being received by the emulated storage device endpoint, performing processing services on the access request to obtain a processed access request, the processing services being unsolicited by the application and the processing services comprising:

identifying that the access request was received via the emulated storage device endpoint;

matching the emulated storage device endpoint to a portion of processing services provided by the NIC; and selecting the processing services based on the portion of the processing services provided by the NIC;

identifying a target storage device for the access request, the target storage device being a first emulated storage device among the one or more storage devices emulated by the NIC and is different from the emulated storage device; and servicing the access request using the identified target storage device and the processed access request.

17. The data processing system of claim 16, wherein the processing services comprise one selected from a group consisting of deduplication, encryption, compression, and integrity verification.

18. The data processing system of claim 16, wherein routing the access request comprises:

transmitting the access request onto a bus operably connected to the NIC; and receiving the access request via the bus, the transmitting and receiving being performed using two endpoints presented by the NIC, and one of the two endpoints being the emulated storage device endpoint.

19. The data processing system of claim 18, wherein the bus is a virtual bus between the emulated storage device endpoint and a connection endpoint of the NIC that is available to the application.

20. The data processing system of claim 16, wherein the target storage device is remote to the data processing system.

\* \* \* \* \*